W. W. SOMERFORD.
HONEY EXTRACTOR.
APPLICATION FILED MAY 22, 1916.
1,245,283. Patented Nov. 6, 1917.
2 SHEETS—SHEET 2.
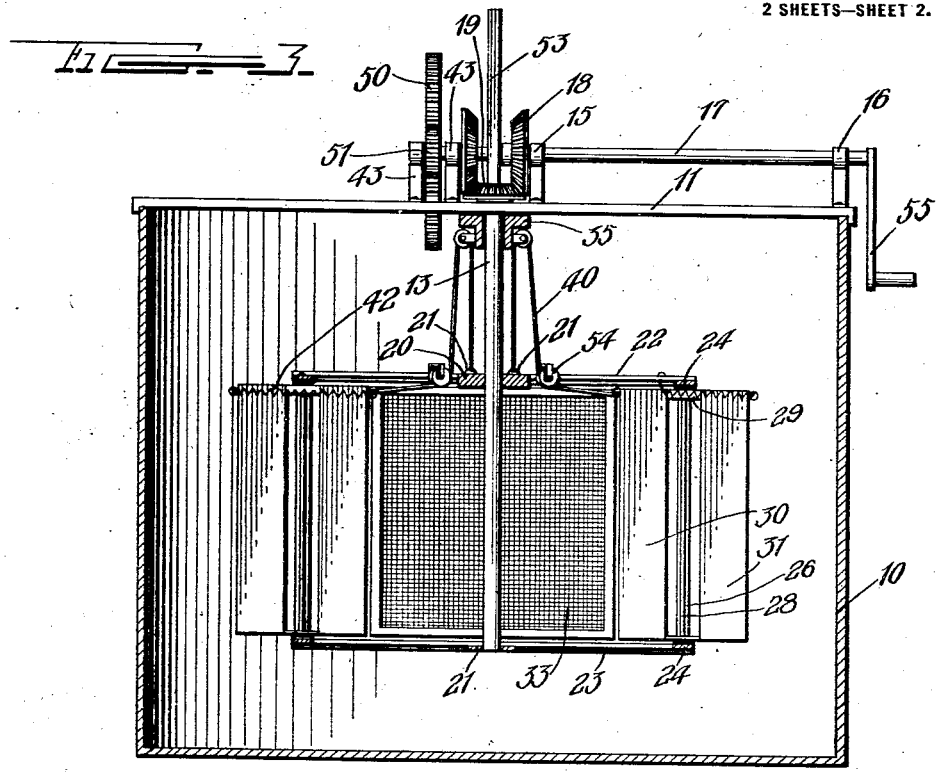
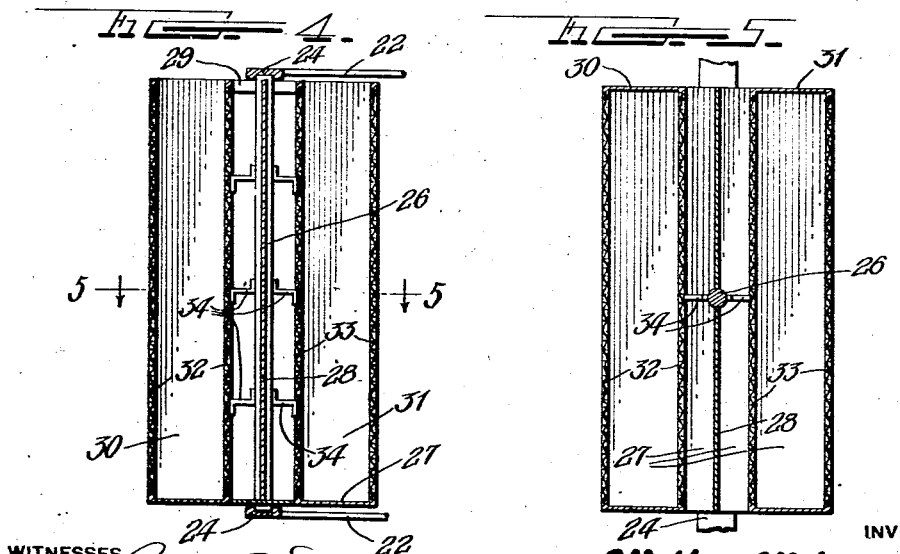
WITNESSES
INVENTOR
Walter W. Somerford.
BY
ATTORNEY

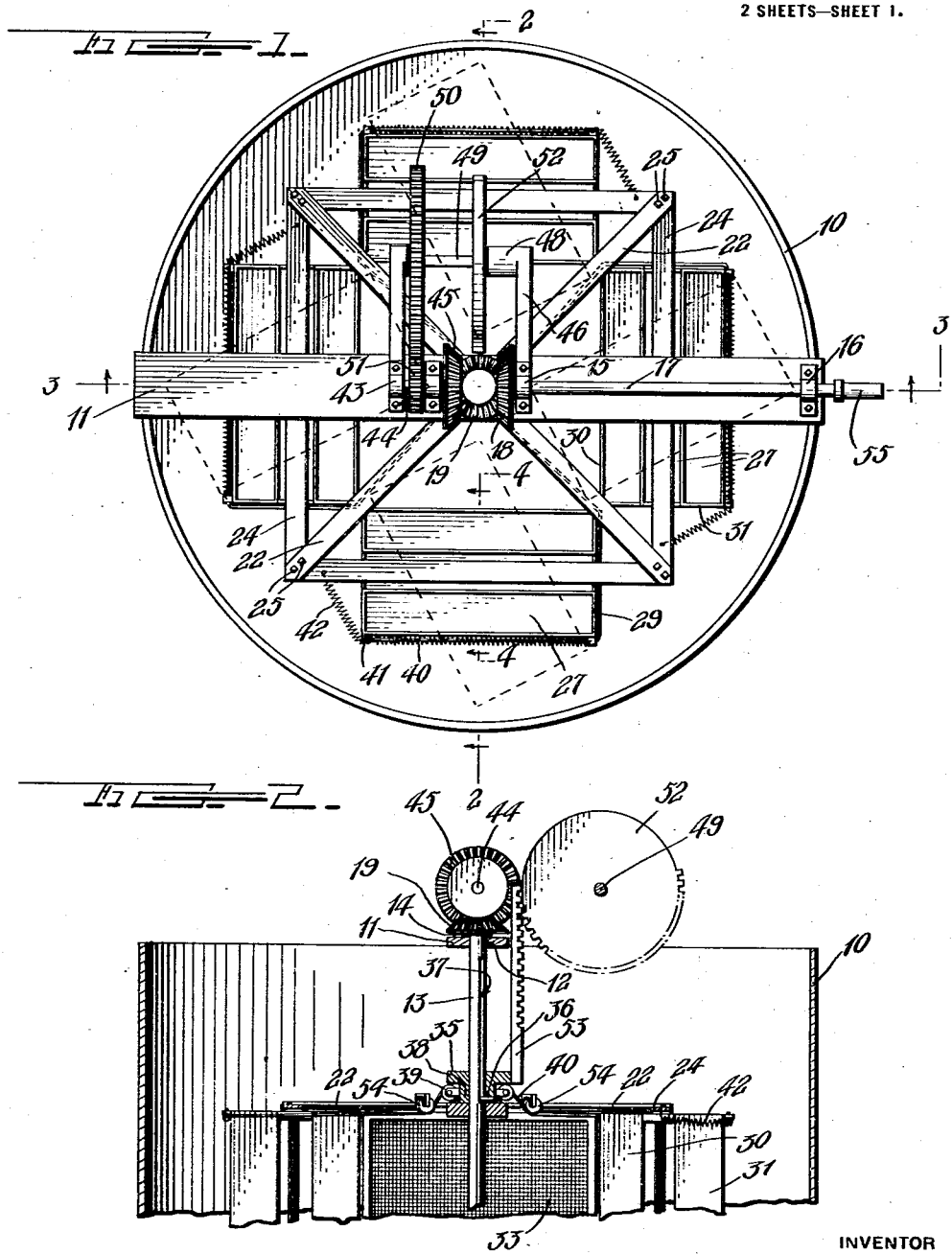

UNITED STATES PATENT OFFICE.

WALTER W. SOMERFORD, OF CANDELARIA, CUBA.

HONEY-EXTRACTOR.

1,245,283.    Specification of Letters Patent.    Patented Nov. 6, 1917.

Application filed May 22, 1916. Serial No. 99,230.

*To all whom it may concern:*

Be it known that I, WALTER W. SOMERFORD, a citizen of the United States, residing at Candelaria, in the Province of Pinar Del Rio and Republic of Cuba, have invented certain new and useful Improvements in Honey-Extractors, of which the following is a specification.

The present invention has relation to certain new and useful improvements in honey extracting apparatus and as its general object aims to provide a novel device of this nature wherein the comb pockets are automatically reversed during operation of the machine at predetermined times, so as to insure the thorough extraction of honey from the comb in a manner that will obviate the necessity of stopping or in fact retarding the speed of operation of the machine in any manner.

A further object of my invention is to provide a device of the type in question that is extremely simple in construction, strong and durable, and highly practical from both the standpoint of the manufacturer and the standpoint of the user; and which, it is believed, may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Figure 1 is a view in top plan showing my invention as in its preferred embodiment;

Fig. 2 is a view showing the device broken away to illustrate more clearly the mechanism for reversing the comb pockets;

Fig. 3 is a view in cross section of the container showing the comb pockets in their initial position;

Fig. 4 is a view in vertical section of the respective comb pockets; and

Fig. 5 is a view in cross section taken on line 5—5 of Fig. 4.

In reducing my invention to practice, I first provide a suitable container 10 which may be formed of any desirable material and which carries at its upper end, a transversely arranged carrying bar 11. This bar is fixed in place in any desired manner such as by riveting, bolting or otherwise. However, in view of the fact that this feature does not form any part of the present invention, I do not desire to limit myself to any specific form, of sewing means.

At a point spaced from the ends thereof, the bar 11 is provided with an opening which accommodates a carrying shaft 13, the latter having a collar 14 adjacent its upper end to limit downward movement, as clearly shown in Fig. 3. The bar 11 is further provided with spaced bearings 15 and 16 respectively, for supporting a drive shaft or universal operating member 17, the latter carrying a crown gear 18 for co-meshing engagement with the pinion 19 of the carrying shaft. Consequently, upon rotation of the shaft 17, motion will be likewise imparted to the carrying shaft 13 through the instrumentality of the gears above referred to.

Below the bar 11 the shaft 13 carries a pair of spaced fixed collars 20 and 21 respectively, from which radiate a series of properly alined carrying arms 22 and 23 respectively. At their free ends, the arms 22 and 23 are connected by bearing portions 24, as at 25, the said bearing portions preferably extending at right angles with respect to each other, as clearly shown in Fig. 1.

As clearly shown in Fig. 1, I provide a series of pairs of comb pockets to be movably associated with the bearing portions 24; yet in view of the fact that each of the pairs of pockets are of substantially the same construction, only one pair, such as shown in detail in Figs. 4 and 5, will be described specifically. In carrying this into practice, I provide a stub shaft 26, which has its end portions journaled in opposite ones of the bearing portions 24, such as shown in Fig. 4, the said shaft being provided adjacent its lower end with a bottom plate 27, which constitutes the bottom of the comb pockets. A separating plate 28, that is preferably formed of metal is arranged to extend longitudinally with respect to the bottom plate 27, as shown in Fig. 5, the same being spaced properly from the longitudinal edges of the plate and preferably arranged in alinement with the shaft 26. At its upper end, the plate 28 carries a suitable frame structure 29, preferably rectangular in form and corresponding in dimension with the plate 27; the same projecting to each side of the plate 28 in order to be in proper alinement with the plate 27. Side pieces 31 and 31 are arranged on the plate 27 in alined relation and are connected at their upper ends by the frame 29. Sheets of reticulated fabric 32 and 33 may then be employed to connect the alined side pieces 31 and 31, consequently forming a pair of pockets, one on each side of the separating plate 28.

As will be noted upon reference to Fig. 4, the inner sheets of recticulated fabric 32 and 33 are in spaced relation with the separating plates; however, in order to retain these sheets in this position at all times, especially during the operation of this device, I preferably interpose a series of ribs 34 between the sheets of wire fabric and the separating plates, the ribs being affixed to the respective elements, in any desired manner. Being open at their upper ends, the pockets may be made to receive the comb in the usual manner and securely retain the same in place during operation.

As will be noted upon reference to Fig. 2, I provide a series of pairs of receiving pockets, approximately one pair of pockets to each pair of alined bearing members. On the other hand, it is to be understood that I am not limited to the specific number of pairs of pockets shown, since any number may be provided if it is so desired.

With a view of providing means to properly shift the pairs of pockets during operation of the machine, without necessitating the stopping or slowing up thereof, I first provide the carrying shaft 13 with a movable collar 35 whose key 36 normally operates in a longitudinal key way 37 of the shaft so as to render the collar bodily rotatable with the shaft. The collar 35 in turn carries a depending sleeve 38 upon which is mounted a series of suitably arranged pulleys 39, while a series of flexible elements 40 each having one end attached to the respective member 20, as at 21, operates about the said pulleys as clearly shown in Fig. 3. The other end of each flexible cable 40 connects with the outer one of the pairs of comb pockets, as at 41, (see Fig. 1). Retractile springs 42 are carried by the cross members 24, as shown in Fig. 1, and each has one end fixed to the outer one of the comb pockets, adjacent one end thereof, opposite to the point of connection 41 of the cables 40. Consequently, when in their normal position, the comb pockets lie as shown in full lines in Fig. 1, the collar 35 being of course in the position shown in Fig. 2.

I further provide the bar 11 with spaced carrying bearings 43 for supporting the stub shaft 44, while the stub shaft 44 carries a beveled pinion 45, for co-meshing engagement with the pinion 19 of the carrying shaft 13. The bar 11 carries adjacent the bearings 15 and 43 respectively, a pair of spaced supporting arms 46, the same having their outer ends formed into bearings 48 for the accommodation of shaft 49. The shaft 49 is now provided with a gear wheel 50 for co-meshing engagement with the pinion 51 of the stub shaft 44 and further carries a segmental gear 52 for the purpose that will subsequently appear.

By providing the collar 35 with an upstanding rack bar 53 in alinement with the segmental or mutilated gear 52, provision is made for the raising and lowering of the said collar, at certain times, such as is obvious. In other words, the segmental or mutilated gear 52 being feather keyed to the shaft 49 is of course operated by the gear 52 when the teeth thereof engage with the rack bar 53, and the latter will be elevated so as to move the collar 35 into the position shown in Fig. 3. However, upon releasement of the rack bar by the segmental gear 52, the latter as well as the collar 35 will be drawn into its initial position by action of gravity assisted by the spring 42, as will subsequently appear.

Upon reference to Fig. 3, it will be noted that by arranging pulleys 54 on the arms 22 for engagement with the cables 40, the movement of the collar 35 will be sufficient to draw the comb pockets into a completely reversed position.

The operation of my invention is substantially as follows:—

Any desired means may be provided for imparting movement to the shaft 17; however, in the drawings I have shown a handle 55 for this purpose. Upon rotation of the shaft 17, like movement will be also transmitted to the carrying shaft 13 by way of the gears 18 and 19, so that the comb pockets may be operated so as to cause the honey to be released, by centrifugal force and fall into the container 10. When the parts are in the position shown in Fig. 1 and in operation, the honey in the forward pocket will be completely extracted, while upon reversal of the comb pockets, the honey in the other pockets will also be completely extracted. In other words, as the turning of the segmental gear 52 continues, the teeth thereof will become engaged with the teeth of the rack bar 53, so that the latter is moved upwardly, carrying with it the collar 55. Upon movement of the collar 55 in this direction, the cables 40 will be acted upon by the pulleys 39, and the comb pockets thus drawn into a reversed position, against the tension of the coil spring 42. By arrangement of the pulleys 39 and 54 as shown, the outer ends of the cables will move approximately twice the distance of movement of the collar so that when the collar is in the position shown in Fig. 3, the comb pockets will be in a completely reversed position. Consequently when the teeth of the segmental gear 52 become disengaged with the rack bar, the latter will be released and the comb pockets will be drawn into their initial position by the tension of the springs 42. This movement of the comb pockets will also serve to draw the collar 35 into its initial position and the rack bar will be held so as to engage by the segmental gear upon another half turn of the latter. From the foregoing, it will be recognized that the device that I have provided comprises means to reverse the comb pockets at predetermined times without necessitating the retarding or slowing up of the machine in any way, whereby the honey will not only be thoroughly extracted from the comb before the breaking up process but the entire process of extracting the honey may be accomplished quickly and easily. Furthermore, it will be noted that the entire operation of the comb pockets is automatic and does not depend upon the attention of the operator. In view of the fact that the advantages and novel features of my invention appear to be apparent from the foregoing, further detail description is deemed unnecessary.

In reducing my invention to practice, I find that the form referred to herein as the most practical and preferred embodiment is the most efficient; but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention, what I claim as new and desire to secure by Letters Patent is:—

1. A honey extractor comprising a body portion, comb pockets, an operating member, means operable by said operating member to drive said comb pockets centrifugally about a common axis and to automatically rotate and reverse the rotation of said comb pockets on their respective axes during operation and while the speed of said operating member remains constant.

2. A honey extractor comprising a series of comb pockets, an operating member, means controllable by said operating member to drive said comb pockets centrifugally about a common axis and to rotate and reverse the rotation of said comb pockets on their respective axes during operation and while the direction and speed of movement of said operating member remains constant.

3. A honey extractor comprising a body structure, a carrying frame revolubly mounted therein, comb pockets carried by said carrying frame and being bodily movable therewith and also rotatable with respect thereto, means to rotate said frame, and means to impart to each of said comb pockets a partial rotation with relation to said carrying frame and return said pockets to their initial position at predetermined times during rotation of said frame in the constant direction.

4. In a honey extractor, a container body, a carrying structure rotatably mounted therein, comb pockets carried by said structure to receive the combs of honey, means to drive said carrying structure rotatably with respect to said container body, means to yieldingly retain said comb pockets in their normal position, means to automatically reverse said comb pockets against the tension of said yieldable means during operation of the extractor, and means to become operative at certain times to permit such yieldable means to return said comb pockets to their normal position, as and for the purpose specified.

5. In a honey extractor, a container body, a carrying structure rotatably mounted therein, pairs of comb pockets carried by said structure, resilient means to normally retain one of said comb pockets of each pair in its outermost position with respect to the carrying frame, means to drive said carrying frame, means to become operative at predetermined times during the operation of the extractor to move said comb pockets against the tension of said resilient means into a reversed position whereby the normally innermost pockets of each of said pairs will be in its outermost position with respect to said carrying frame, and means to become operative at predetermined times during the operation of the extractor to permit said pairs of comb pockets to be drawn into their initial position by contraction of said resilient means, as and for the purpose specified.

6. In a honey extractor, a container body, a carrying shaft in said container body, a supporting structure fixed on said carrying shaft and rotatable bodily therewith, comb pockets movably associated with said structure and bodily movable therewith, resilient means to normally retain said comb pockets in a set position, a collar splined on said shaft, means connecting said collar and said comb pockets, means to drive said shaft to rotate said carrying structure and said comb pockets, and means to be driven by said first mentioned driving means to move said collar at certain times and cause the movement of said comb pockets to a reversed position and to release said collar at predetermined times to permit said comb pockets to return to their normal position under tension of said resilient means, as and for the purpose specified.

7. In a honey extractor, a container body, a carrying shaft arranged therein, a structure to be bodily movable with said carrying shaft, comb pockets carried by said pockets, resilient means to resist rotative movement of said comb pockets in one direction with respect to said carrying frame flexible means to move said comb pockets rotatably against the tension of said resilient means, and common means to drive said shaft and cause movement of said flexible means, as and for the purpose specified.

8. In a honey extractor, a container body, a supporting member arranged transversely with respect to said container body, a carrying shaft journaled through said supporting member, a structure on said carrying shaft to be bodily rotatable therewith, pairs of comb pockets carried by said carrying structure and bodily movable therewith, means to drive said shaft to impart a rotative movement of said carrying structure and said pairs of comb pockets, coil springs having one end affixed to said carrying frame and the other end affixed to the normally outer one of said pairs of comb pockets, a collar splined to said shaft and movable longitudinally thereon, pulleys carried by said collar, flexible cables having one end affixed to said carrying structure and trained about said pulleys, other pulleys on said carrying structure, said flexible cables trained about said last mentioned pulleys and connected with the outer end of the comb pockets of each of said pairs at a side opposite to the point of connection with said coil springs, a segmental gear to be driven by said first mentioned driving means, a rack bar on said collar in alinement with said segmental gear, whereby said segmental gear will cause the elevation of said collar upon said shaft at certain times to operate said cables and draw said comb pockets into a reversed position against the tension of said coil spring and release said rack bar whereby said comb pockets may move to their initial position under tension of said coil springs, as and for the purpose specified.

9. A honey extractor comprising means for revolving a honey comb in a constant direction and at constant speed in an orbit and at the same time repeatedly rotating said honey comb in opposite directions on an axis extending through said honey comb.

In testimony whereof I affix my signature in presence of two witnesses.

WALTER W. SOMERFORD.

Witnesses:
José Ma. Rodriguez,
Roy Soper.